(12) United States Patent
Sun

(10) Patent No.: US 11,169,752 B2
(45) Date of Patent: Nov. 9, 2021

(54) IMAGE FORMING SYSTEM, IMAGE FORMING APPARATUS, AND IMAGE FORMING METHOD ALLOWING SERVERLESS PULL PRINTING

(71) Applicant: KYOCERA Document Solutions Inc., Osaka (JP)

(72) Inventor: Changsong Sun, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/670,923

(22) Filed: Oct. 31, 2019

(65) Prior Publication Data
US 2021/0132879 A1 May 6, 2021

(51) Int. Cl.
*G06F 3/12* (2006.01)

(52) U.S. Cl.
CPC .......... *G06F 3/1238* (2013.01); *G06F 3/1222* (2013.01)

(58) Field of Classification Search
CPC combination set(s) only.
See application file for complete search history.

(56) References Cited

U.S. PATENT DOCUMENTS

| | | |
|---|---|---|
| 7,519,302 B2 | 4/2009 | Matsuhara |
| 7,769,636 B1 | 8/2010 | Kamiya |
| 2003/0197887 A1* | 10/2003 | Shenoy ................ G06F 3/1285 358/1.15 |
| 2005/0030574 A1* | 2/2005 | McVey ................ G06F 3/1286 358/1.14 |
| 2012/0127519 A1* | 5/2012 | Kikuchi ................ G06F 3/122 358/1.15 |
| 2013/0314737 A1* | 11/2013 | Jang .................... H04N 1/00856 358/1.14 |
| 2014/0366101 A1 | 12/2014 | Murata |
| 2015/0278506 A1* | 10/2015 | Jun ........................ G06F 21/44 726/6 |
| 2016/0105587 A1* | 4/2016 | Sugiyama ............. G06F 3/1222 358/1.14 |
| 2016/0285871 A1* | 9/2016 | Chathoth ............ H04L 63/0807 |
| 2017/0199710 A1* | 7/2017 | Ando ..................... G06F 3/1267 |
| 2018/0203655 A1* | 7/2018 | Nishida ................ G06F 3/1238 |
| 2019/0265919 A1* | 8/2019 | Mohammad .......... G06F 3/1267 |
| 2021/0149610 A1* | 5/2021 | Deguchi ............... G06F 3/1222 |
| 2021/0165617 A1* | 6/2021 | Adachi ................. G06F 21/608 |

\* cited by examiner

*Primary Examiner* — Helen Zong
(74) *Attorney, Agent, or Firm* — Hawaii Patent Services; Nathaniel K. Fedde; Kenton N. Fedde

(57) ABSTRACT

Provided is an image forming system that pull prints without a server. A job storage stores the job of pull print. An authentication information generating part generates authentication information for authenticating for pull print. An authentication part authenticates with the generated authentication information. A job transmitting part transmits the job stored in the job storage when it succeeds in authentication. A job acquiring part acquires a job when it succeeds in authentication by the authentication information. An image formation part performs image formation of the acquired job.

10 Claims, 6 Drawing Sheets

IMAGE FORMING SYSTEM, IMAGE FORMING APPARATUS, AND IMAGE FORMING METHOD ALLOWING SERVERLESS PULL PRINTING

BACKGROUND

The present disclosure relates to an image forming system, an image forming apparatus, and an image forming method, especially is related with the image forming system, image forming apparatus, and image forming method capable of pull printing.

An image forming apparatus, such as an MFP (Multifunctional Peripheral), which can print a document and an image, is present.

The image forming system, which includes an image forming apparatus and a server and is capable of pull printing, is also present. In such a system, a document data, which the user has printed, is once accumulated in the server. Then, by using the operation panel part of an image forming apparatus, the user can select the document data, and it is to be printed.

On the other hand, a typical system that manages the scanned data with the divided memory storage when scanning a document is also known.

SUMMARY

An image forming system of the present disclosure is an image forming system having a terminal allowing to generate a job of a pull print and an image forming apparatus being connected with the terminal including: the terminal comprising: a job storage configured to store the job of the pull print, an authentication information generating part configured to generate authentication information for authenticating the pull print, an authentication part configured to authenticate the authentication information generated by the authentication information generating part, and a job transmitting part configured to transmit the job stored in the job storage when being success in authentication by the authentication part; and the image forming apparatus comprising: a job acquiring part configured to acquire the job from the terminal when connecting with the terminal and being success in authentication by the authentication information, and an image formation part which performs image formation of the job acquired by the job acquiring part.

An image forming apparatus of the present disclosure is an image forming apparatus being connected with a terminal allowing to generate a job of a pull print, comprising: a job acquiring part configured to acquire the job from the terminal when connecting with the terminal and succeeding in authentication; and an image formation part configured to perform image formation of the job acquired by the job acquiring part.

An image forming method of the present disclosure is an image forming method executed by an image forming system having a terminal allowing to generate a job of a pull print and an image forming apparatus being connected with the terminal, comprising the steps of: by the terminal, storing the job of the pull print; by the terminal, generating authentication information for authenticating the pull print; by the image forming apparatus, connecting with the terminal; by the terminal, authenticating about the generated authentication information; by the terminal, transmitting the stored job when being success in authentication; by the image forming apparatus, acquiring the job from the terminal; and by the image forming apparatus, performing image formation of the acquired job.

BRIEF DESCRIPTION OF THE DRAWINGS

FIG. 7 is a screen example in the pull print process as shown in FIG. 5.

DETAILED DESCRIPTION

Embodiment

[System Configuration of Image Forming System X]

Figure 1:
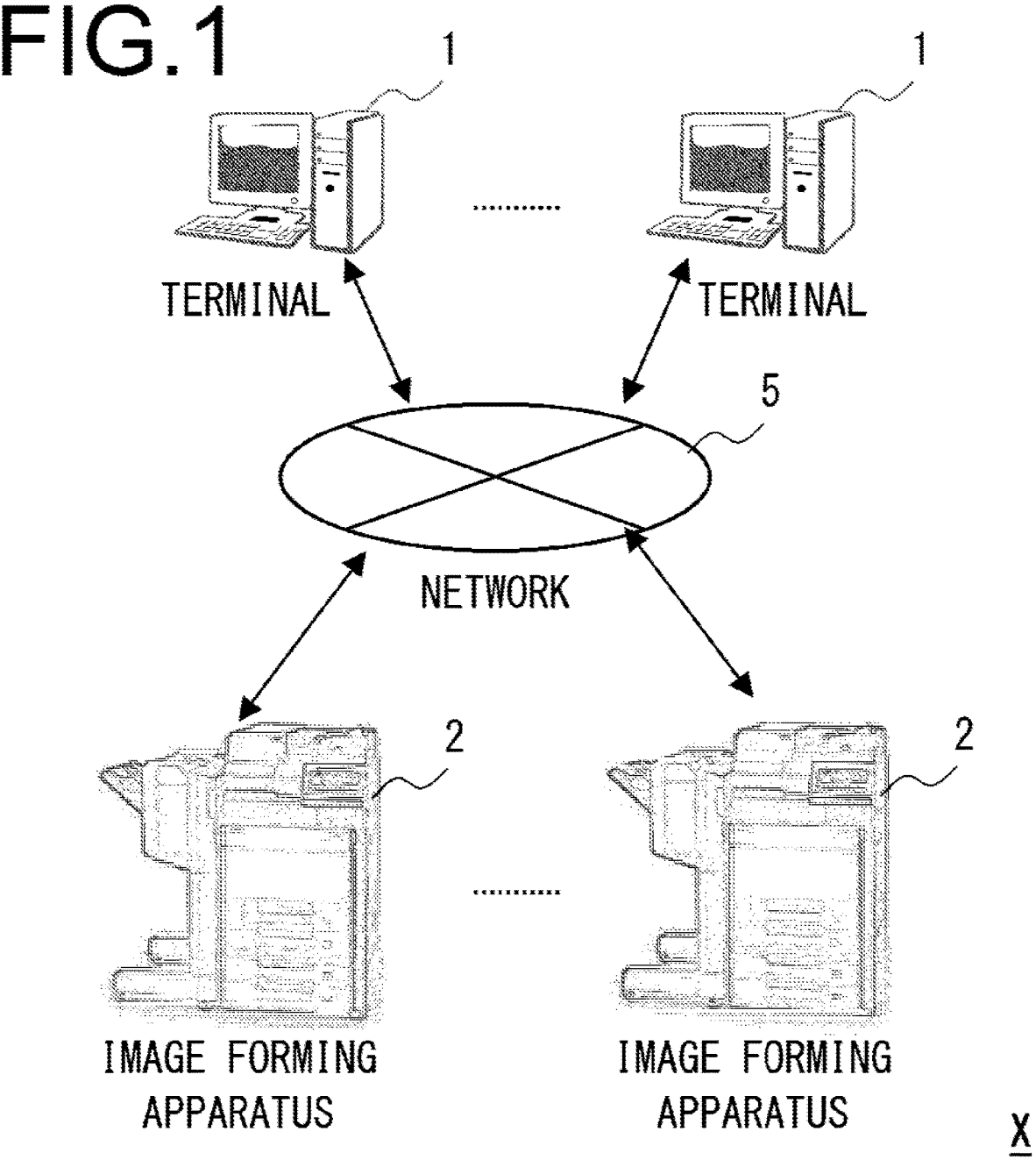
FIG. 1 is a system configuration figure of the image forming system according to the embodiment of the present disclosures.
Figure 2:
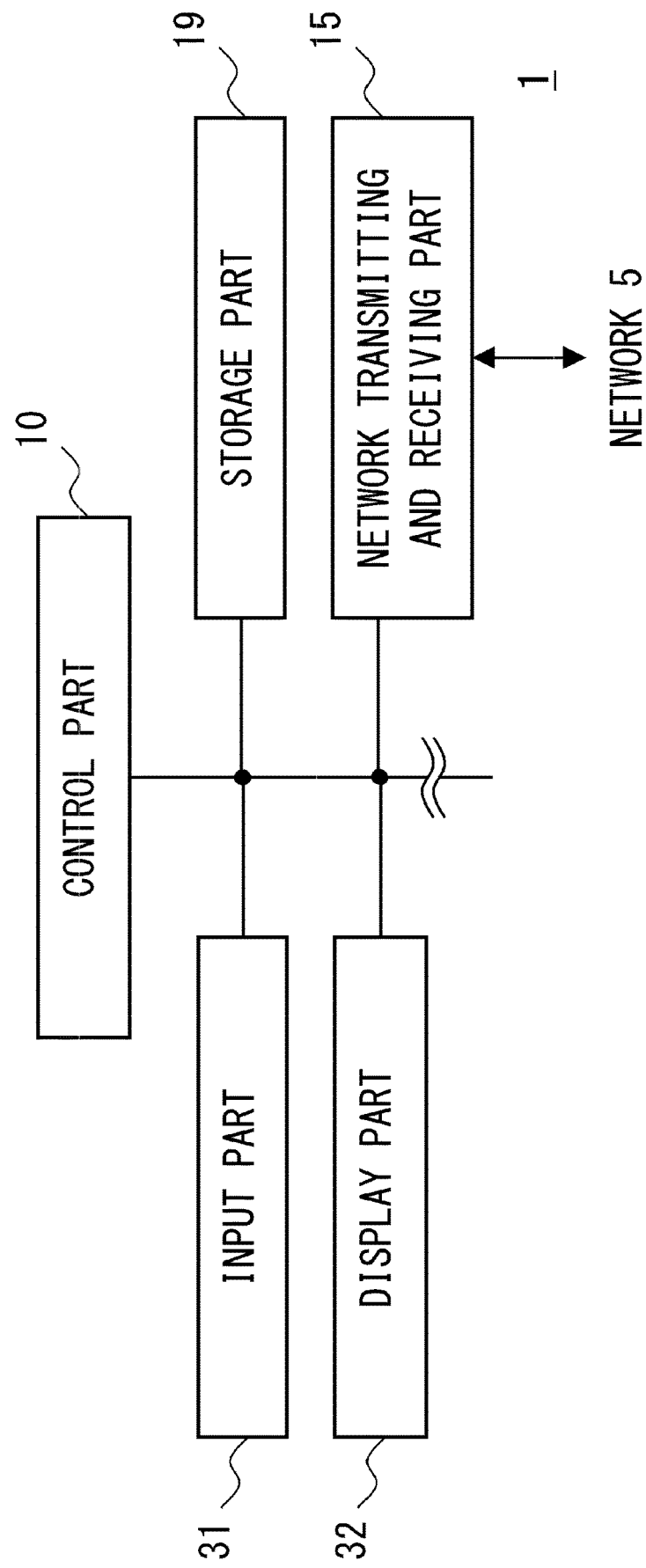
FIG. 2 is a block diagram showing the control configuration of the terminal as shown in FIG. 1.
Figure 3:
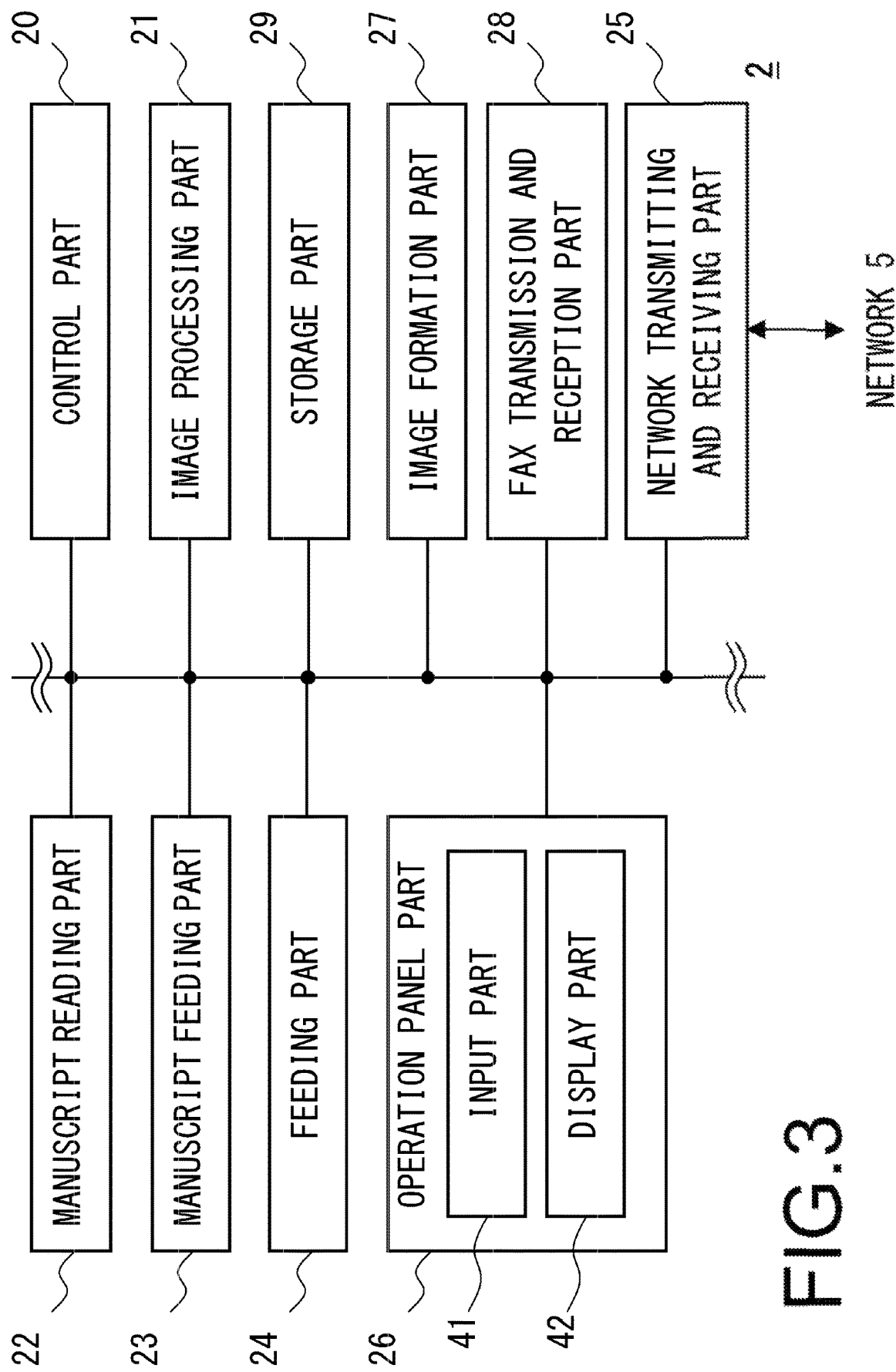
FIG. 3 is a block diagram showing the control configuration of the image forming apparatus as shown in FIG. 1.

First, with reference to FIG. 1-FIG. 3, a system configuration of image forming system X according to the embodiment of the present disclosure is explained. Here, image forming system X of the present embodiment is a pull print printing system that includes a plurality of terminals 1 and a plurality of image forming apparatuses 2. That is, unlike a typical system, image forming system X of the present embodiment does not need a dedicated apparatus, such as a server for a pull print (henceforth "serverless"). In image forming system X of the present embodiment, each terminal 1 and image forming apparatus 2 are connected via network 5.

Terminals 1 are terminals, such as PC, a mobile phone, a smart phone, PDA (Personal Data Assistant), a business-use terminal, a dedicated terminal, and the like. As for terminal 1, a general-purpose OS (Operating System), or the like, is executing. Also, terminal 1 can perform installation of a control program, such as a device driver for image forming apparatus 2, or the like. Thereby, it becomes possible to perform to use function of image forming apparatus 2, such as a pull print, a direct print, a scan, FAX transmission and reception, network FAX, or the like, by the OS and various application software (henceforth "application").

Image forming apparatuses 2 are information processing apparatuses, such as an MFP, a network scanner, a document scanner, network FAX, a printer, and the like, which can transmit and receive various data. Image forming apparatus 2 can perform pull print printing, direct printing, copy, scan, facsimile transmission, or the like, and can also output job 300 (FIG. 4) generated in terminal 1. In this case, in the present embodiment, the dedicated application that enables serverless pull print is installed in image forming apparatus 2, and it is executed.

Network 5 is a network, LAN (Local Area Network), such as Intranet, WAN (Wide Area Network), such as the Internet, a mobile phone network, or the like. If network 5 is LAN, it may be a wireless LAN, such as WiFi, or the like. If network 5 is WAN, it may connect with a so-called "cloud" server via a router, a gateway, or the like. Also, network 5 may be connected with a plurality of networks by VPN (Virtual Private Network), bridge, or the like.

The user can print job 300 (FIG. 4) from arbitrary image forming apparatuses 2 like a typical pull print. However, in the present embodiment, each image forming apparatus 2 can output job 300 (FIG. 4), which is spooled in terminal 1 without using a server, or the like.

(Configuration of Terminal 1)

Then, as refer to FIG. 3, a configuration of terminal 1 is described. Terminal 1 is provided with control part 20, network transmitting and receiving part 25, input part 31, display part 32, and the storage part 29, or the like.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, processor for particular applications), or the like. Control part 10 reads the control program stored in ROM and HDD of storage part 19, expands the control program to RAM, execute it, and is operated as each means of the functional block as described later.

Input part 31 is a keyboard, various sensors, a pointing device, or the like, for acquiring the various instructions by a user. The pointing device includes a touch panel, a digitizer, a touchpad, or the like. Input part 31 can make various instructions input by a user and can acquire this by using GUI (Graphical User Interface) on OS. Also, by the instruction that the user inputted on input part 31, a process that generation or transmission of job 300 (FIG. 4), input or change of each user information or authentication information, or the like, is possible.

Display part 32 is a flat display panel, such as LCD, an organic electroluminescence display, FED, a fluorescent display tube, or the like, a projector, LEDs for status displays, or the like. Display part 32 can display the various operation screens with GUI. In addition, input part 31 and display part 32 may be integrally formed as like a display with a touch panel or a digitizer, or the like.

Network transmitting and receiving part 25 is a network connection part including a LAN board, a wireless transmitter receiver, or the like, for connecting with network 5.

Storage part 19 is a storage part by using a non-transitory recording medium. Storage part 19, for example, may include various RAM (Random Access Memory) as a main memory part. Also, storage part 19, for example, may include ROM (Read Only Memory), eMMC (embedded Multi Media Card), SSD (Solid State Drive), HDD (Hard Disk Drive), or the like, as an auxiliary memory part. Also, storage part 19 may include external storages, such as various flash memories and an optical recording medium.

Also, the control program for operation-controlling terminal 1 is stored in the auxiliary memory part of storage part 19. The control program includes OS, programs and data of various applications, or the like. Also, the control program includes a middleware being worked on OS, a device driver that controls image forming apparatus 2, or the like.

(Configuration of Image Forming Apparatus 2)

Then, referring to FIG. 2, the control configuration of image forming apparatus 2 is described. Image forming apparatus 2 includes control part 20, image processing part 21, manuscript reading part 22, manuscript feeding part 23, feeding part 24, network transmitting and receiving part 25, operation panel part 26, image formation part 27 (image forming means), FAX transmission and reception part 28, and storage part 29, or the like. Each part is connected to control part 20 and is operation-controlled by control part 20.

Control part 20 is an information processing part, such as GPP, CPU, MPU, DSP, GPU, ASIC, or the like. Also, control part 20 controls a whole device corresponding to the specified instructions information inputted in operation panel part 26 or from terminal 1.

Image processing part 21 is a control arithmetic part, such as DSP (Digital Signal Processor), GPU (Graphics Processing Unit), or the like. Image processing part 21 performs specified image process for image data. This specified image process may be a process of scaling, concentration tuning, gradation adjustment, an image improvement, or the like, for example. Also, image processing part 21 stores the image read by manuscript reading part 22 as print data to storage part 29. In this case, image processing parts 21 is also possible to convert the print data into electronic filing documents, such as PDF (Portable Document Format), various files, such as a word processor and a spreadsheet, a file of image data, such as TIFF and a bitmap (only henceforth "document data"). Also, image processing part 21 may perform at least a part of OCR (Optical Character Recognition) process.

Manuscript reading part 22 reads a manuscript, which is set. Also, manuscript reading part 22 is arranged on the upper part of the body part of image forming apparatus 2. Manuscript reading part 22 is provided with a scanner, platen glass, and a manuscript reading slit. When reading the manuscript placed on platen glass, manuscript reading part 22 moves a scanner to the position that faces platen glass, reads with scanning the manuscript placed on the platen glass and acquires image data, and outputs the acquired image data to control part 20.

Also, when reading the manuscript fed from manuscript feeding part 23, manuscript reading part 22 moves the scanner to the position that faces to the manuscript reading slit. Then, via the manuscript reading slit, manuscript reading part 22 reads the manuscript synchronizing with the conveying operation of the manuscript by manuscript feeding part 23 and acquires an image data. Manuscript reading part 22 outputs the acquired image data to control part 20.

Manuscript feeding part 23 conveys the manuscript read by manuscript reading part 22. Manuscript feeding part 23 is arranged on the upper part of manuscript reading part 22. Manuscript feeding part 23 is provided with a manuscript mounting part and a manuscript transport mechanism. Document feeding part 23 feeds the manuscript placed on the manuscript mounting part one by one in order by the manuscript transport mechanism and feeds the manuscript to manuscript reading part 22.

Feeding part 24 feeds out a recording paper one by one directing to image formation part 27. Feeding part 24 is provided with the body part.

Network transmitting and receiving part 25 is a network connection part including a LAN board, a wireless transmitter receiver, or the like, for connecting with external networks, such as LAN, wireless LAN, WAN, and a mobile phone network, or the like. Network transmitting and receiving part 25 transmits and receives data by the line for data communications, and transmits and receives an audio signal by a voice call line.

Operation panel part 26 is provided with input parts 41, such as a button and a touch panel, or the like, and display parts 42, such as LCD (Liquid Crystal Display) and an organic electroluminescence display, or the like. Also, operation panel part 26 is arranged in front-side of image forming apparatus 2. The button of input part 41 of operation panel part 26 includes a numeric keypad, a start button, a cancel button, a button for switching of operational mode, a button for instructing about selection and execution of job 300, or the like. The operational mode may include a type of mode, which is a copy, a FAX transmission, a scanner, network scanner, or the like. Also, as the instructing about selection and executing of job 300, an instruction of print, transmission, storage, record, or the like, for selected job 300 is included. Input part 41 of operation panel part 26 can also perform the input of the authentication information by a user. The authentication information includes PIN code 311 (FIG. 4) and one-time pass code 320, as described later. In addition, to input and change each user's information by a user instruction acquired from operation panel part 26 is also possible.

Image formation part 27 is an image forming means in the present embodiment. Image formation part 27 perform the image formation from the data, which is stored in storage part 29, is read by manuscript reading part 22, or is acquired from terminal 1, to a recording paper. Image formation part 27 is provided with a photo conductor drum, an exposure part, a developing part, a transfer part, a fixing part, or the like. Image formation part 27 records a toner image on the recording paper by performing the image formation process, which consists of electrification, exposure, development, transfer, and fixing.

FAX transmission and reception part 28 transmits and receives a facsimile. FAX transmission and reception part 28 can perform facsimile reception from other FAX equipment (not shown) via the sound line, preserves on storage part 29, and performs image formation by image formation part 27. Also, FAX transmission and reception part 28 can convert a manuscript read by manuscript reading part 22 or data of network FAX transmitted from terminal 1 into image data and can perform facsimile transmission via the sound line to another FAX equipment.

Storage part 29 is a storage part, which is using a non-transitory recording medium. Storage part 29 may include RAM, ROM, eMMC, SSD, HDD, or the like. The main memory part of storage part 29 may hold stored contents even in the power saving state by a function such as self refreshing, or the like. The control program for operation-controlling image forming apparatus 2 is stored in the auxiliary memory part of storage part 29. In addition, storage part 29 has stored a user account settings, or the like. Also, in storage part 29, an area of the storage folder (document box) for each user may be included.

In addition, control parts 10 and 20 are operated as each means of the functional block as described later by reading the control programs stored in storage parts 19 and 29, expanding the control programs, and executing them, respectively.

Further, in terminal 1 and image forming apparatus 2, control parts 10 and 20 and image processing part 21 are CPU with built-in GPU, a chip-on module package, SOC (System On a Chip), or the like, respectively, and thus some or all of the circuits may be integrally-formed. Also, control parts 10 and 20 and image processing part 21 may have built-in RAM, ROM, flash memory, or the like.

Figure 4:
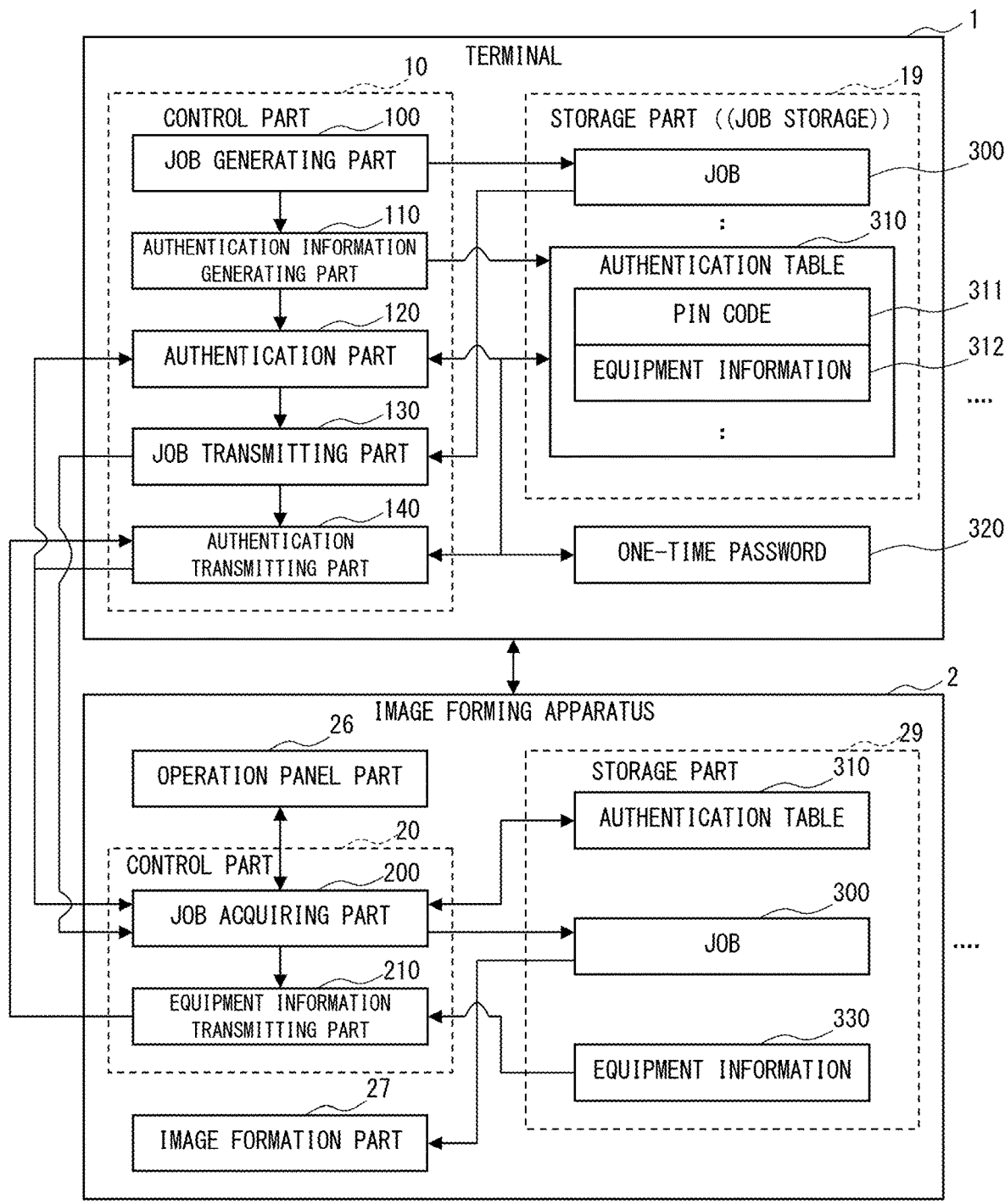
FIG. 4 is a block diagram showing the functional configuration of the image forming system shown in FIG. 1.

[Functional configuration of image forming system X] Here, with reference to FIG. 4, a functional configuration of system X according to the embodiment of the present disclosures is explained. Control part 10 of terminal 1 is provided with job generating part 100, authentication information generating part 110, authentication part 120, job transmitting part 130, and authentication transmitting part 140. Storage part 19 stores job 300, authentication table 310, and one-time password 320. Control part 20 of image forming apparatus 2 is provided with job acquiring part 200 and equipment information transmitting part 210. Storage part 29 stores job 300, authentication table 310, and equipment information 330.

Job generating part 100 generates job 300 by using the device driver for image forming apparatus 2 when outputting, such as printing, or the like, is instructed from various applications.

Authentication information generating part 110 generates authentication information for authenticating of pull print. Authentication information generating part 110 can transmit the authentication information, which is generated, corrected, or the like, among a plurality of terminals 1 and can hold (share) equivalent contents. Here, the authentication information of the present embodiment includes PIN code 311 and one-time password 320.

Authentication part 120 authenticates the authentication information generated by authentication information generating part 110. Authentication part 120 acquires PIN code 311 and one-time password 320 from image forming apparatus 2 to be outputted by pull print and authenticates by using them.

Job transmitting part 130 transmits job 300 stored in storage part 19 to authenticated image forming apparatus 2 when it succeeds in authentication by authentication part 120. Further, job transmitting part 130 can transmit job 300 also for other image forming apparatuses 2, which the authentication information has been transmitted. In this case, the respective other image forming apparatus 2 is possible to output job 300 without performing authentication by the authentication information.

Authentication transmitting part 140 transmits the authentication information to other image forming apparatus 2 and/or other terminal 1. In the present embodiment, authentication transmitting part 140 transmits and shares authentication table 310 including PIN code 311 between terminal 1 and image forming apparatus 2 in the same network 5. Furthermore, authentication transmitting part 140 refers to equipment information 330 of image forming apparatus 2, and when job 300 cannot output with the image forming apparatus 2, transmits the authentication information to other image forming apparatuses 2. In this case, authentication transmitting part 140 can also transmit PIN code 311 and one-time password 320 of authenticated image forming apparatus 2 to other image forming apparatuses 2. Thereby, for example, in the respective other image forming apparatus 2, to permit the output without authentication is possible.

Job acquiring part 200 connects with terminal 1, when authentication is successful, acquires job 300 from terminal 1, and stores it in storage part 29.

Equipment information transmitting part 210 transmits equipment information 330 to terminal 1. Equipment information transmitting part 210, for example, when determining that output is impossible in the self-apparatus by the job information of job 300, transmits equipment information 330 with that effect.

In addition, in the present embodiment, storage part 19 of terminal 1 functions as a job storage that stores job 300 of a pull print. Further, image formation part 27 of image forming apparatus 2 performs image formation of the job 300 acquired by job acquiring part 200.

Job 300 is a document data, or the like, which is generated in terminal 1 and is spooled, or the like, so that a pull print is possible. This document data, as the same as that of the document data of above-mentioned image forming apparatus 2, includes, for example, data written as PDL (Page Description Language), electronic document data, such as PDF, or the like, a file of a word processor, a spreadsheet, or the like. In addition, each job 300 includes information, such as a number of black-and-white pages, a number of color pages, a number of copies, single side or both sides, an output language, or the like, as job information. This job information is used for decision whether the output is possible or not by output ability, a state, or the like, of image forming apparatus 2.

Authentication table 310 is a table that is written data for performing authentication for pull printing job 300 from image forming apparatus 2. Authentication table 310 includes PIN code 311 and terminal information 312.

PIN code 311 is PIN (Personal Identification Number) serving as ID (Identification) for pull printing. In the present embodiment, individual PIN is set up by the user in each terminal 1, which stores job 300 for a pull print in the same network 5.

Terminal information 312 is an IP address, a MAC Address, a port number, protocol information, a domain name, a unique address, a terminal name, or the like, for specifying terminal 1 on network 5. Terminal information 312 is associated with each PIN code 311 and/or user.

One-time password 320 is data of the password, or the like, which is verifiable only in a short period between terminal 1 and image forming apparatus 2. One-time password 320 is set as a character string of a unique alphanumeric character, or the like.

Equipment information 330 includes the information that shows the output ability of image forming apparatus 2 itself. Equipment information 330 includes, for example, a model name, output ability information, a status information of the apparatus, information of a recording paper, and option information. Among these, output ability information includes information that shows ability of output, such as color or monochrome output, duplex printing, and presence or absence of FAX transmission and reception part 28, or the like. The status information of apparatus includes, for example, various information about an output, such as, whether it is on-line, normal operating mode or power saving mode, whether there is an out-of-order or a paper jam, or the like. The information of a recording paper includes information, such as a recording paper size, a type, residual quantity, or the like, for each recording paper cassette. The option information includes an information of optional equipment, such as a sorter, a stapler, or the like. In addition, equipment information 330 may include information, such as a serial number, unique ID, version of OS, firmware, device driver, or the like, version of dedicated application, device ID such as IP address or MAC address, or the like, and other information for identifying self-apparatus.

Here, control part 10 of terminal 1 executes the control program stored in storage part 19 and is functioned as job generating part 100, authentication information generating part 110, authentication part 120, job transmitting part 130, and authentication transmitting part 140. On the other hand, control part 20 of image forming apparatus 2 executes the control program stored in storage part 29 and is functioned as job acquiring part 200 and equipment information transmitting part 210. Also, above-mentioned each part of terminal 1 and image forming apparatus 2 serve as hardware resources to execute the image forming method of the present disclosure. In addition, the above-mentioned part or arbitrary combination of functional configuration may be configured by using an IC, a programmable logic, FPGA (Field-Programmable Gate Array), or the like, as hardware.

Figure 5:
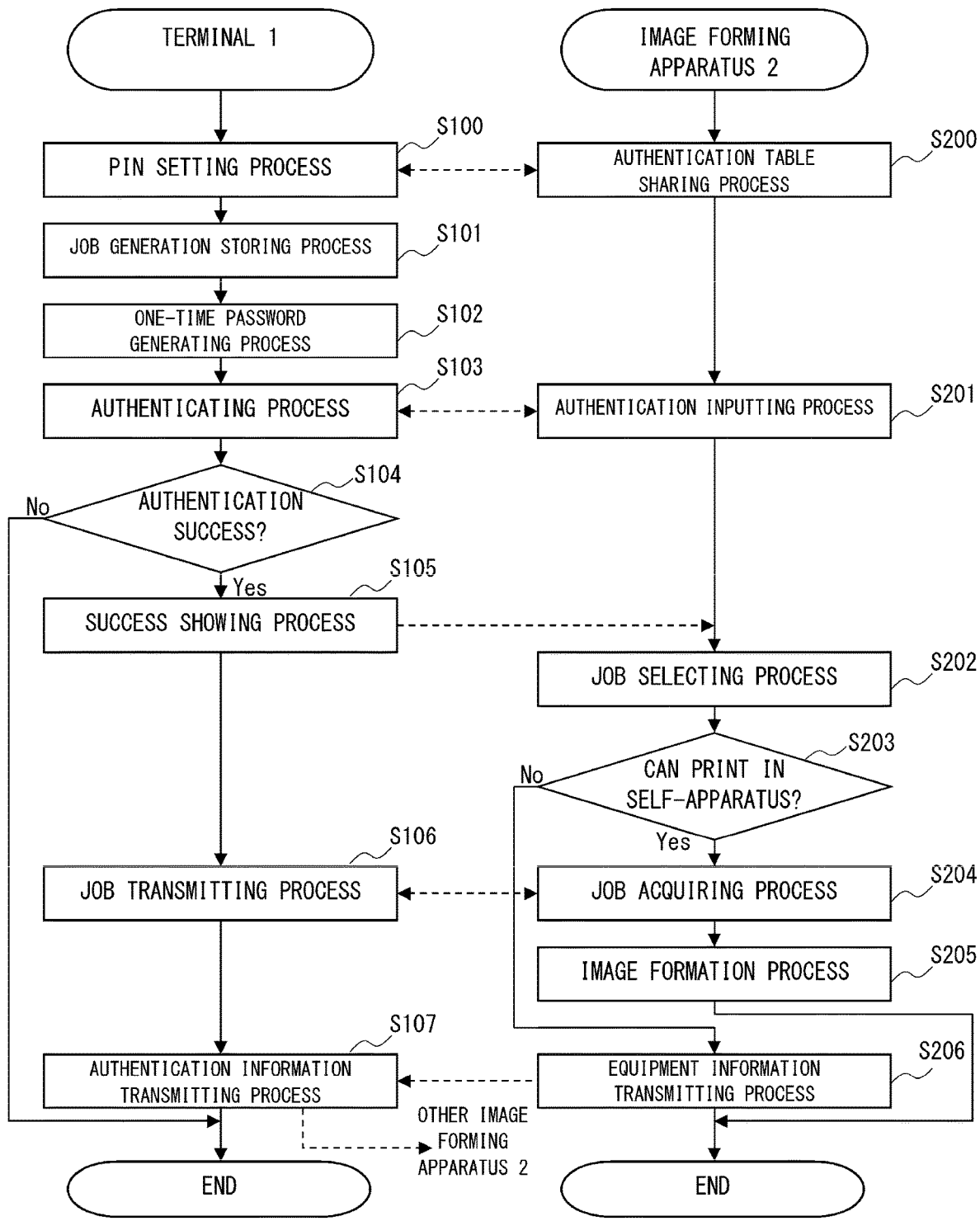
FIG. 5 is a flow chart of the pull print process according to the embodiment of the present disclosure.
Figure 6:
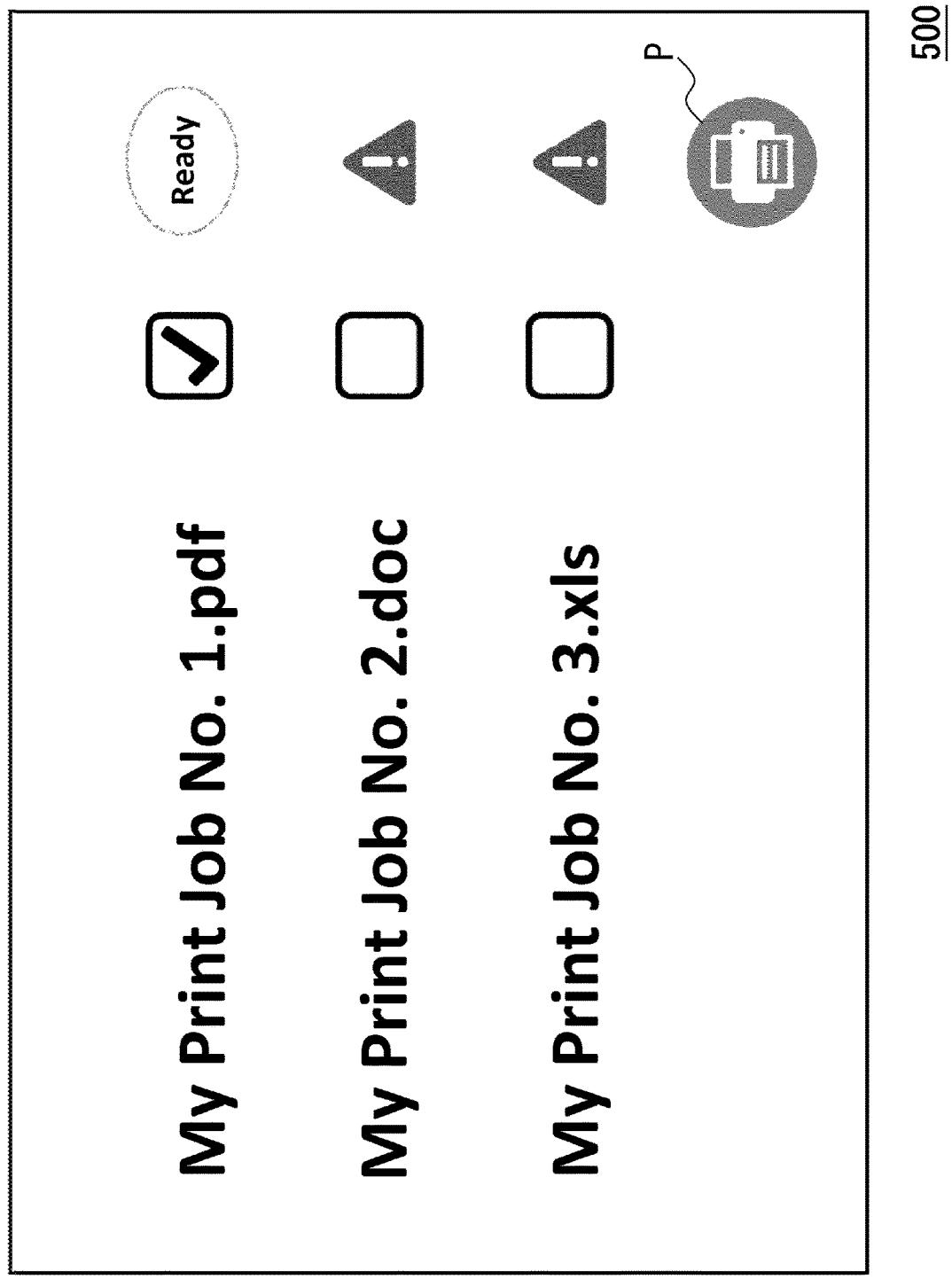
FIG. 6 is a screen example in the pull print process as shown in FIG. 5.

[Pull print process by image forming system X] Then, with reference to FIG. 5-FIG. 7, a serverless pull print process by image forming apparatus 2 according to the embodiment of the present disclosures is explained. In the pull print process in the present embodiment, with terminal 1, job 300 of a pull print is stored. By terminal 1, the authentication information for authenticating a pull print is generated. By image forming apparatus 2, it is connected with terminal 1. By terminal 1, the generated authentication information is authenticated. If authentication with terminal 1 is success, stored job 300 is transmitted. By image forming apparatus 2, job 300 is acquired from terminal 1. By image forming apparatus 2, image formation of the acquired job 300 is performed. In the pull print process of the present embodiment, mainly, control part 10 of terminal 1 executes the control program stored in storage part 19, control part 20 of image forming apparatus 2 executes the control program stored in storage part 29, and they collaborate with each part by using hardware resources. In the following, with reference to the flow chart of FIG. 5, the details of the pull print process of the present embodiment are explained for each step.

(Step S100)

First, authentication information generating part 110 of terminal 1 performs a PIN setting process. When, the device driver of image forming apparatus 2, or the like, is installed in terminal 1, or when the setting of serverless pull print is instructed from the setting screen of the device driver, authentication information generating part 110 makes respective terminal 1 and/or user set up unique PIN. In detail, authentication information generating part 110 acquires PIN code 311 from input part 31 corresponding to a user input. If this PIN code 311 is not in authentication table 310, authentication information generating part 110 can add it. In this case, authentication information generating part 110 is also possible to set up the storage capacity of the area of storage part 19 in terminal 1 that spools job 300, the period to spool, and other printing restrictions. Further, in order that a user can pull print in the period where he or she is not using terminal 1, applying restriction of a time zone, or the like, to be enabled to pull print is also possible.

Then, authentication information generating part 110 may perform broadcasting, or the like, to other terminals 1 in network 5. Thereby, checking that the PIN to add is not set up to the other terminals 1 is possible. Furthermore, terminal 1 can transmit authentication table 310, which the PIN is added, to these other terminals 1 and can store it in storage part 19 of each other (sharing). Thus, by sharing authentication table 310, without putting a load on terminal 1 or image forming apparatus 2, to perform user management based on user's need for pull print on network 5 becomes possible without a server.

(Step S200)

Here, authentication transmitting part 140 of image forming apparatus 2 performs an authentication table sharing process. When a dedicated application is first installed in image forming apparatus 2, serverless pull print is enabled. In this case, authentication transmitting part 140 acquires authentication table 310 from terminal 1 and stores it in storage part 29. Otherwise, authentication transmitting part 140 can acquire authentication table 310 from other image forming apparatus 2, which the dedicated application is installed, by broadcasting, or the like, and can store it in storage part 29.

(Step S101)

Then, job generating part 100 of terminal 1 performs a job generation storing process. When pull print is specified by setting of the driver of image forming apparatus 2, or the like, and printing is instructed from various applications of the terminal 1, job generating part 100 spools document data as job 300 in storage part 19. Otherwise, in this case, job generating part 100 can make a user select the electronic document data, the file of a spreadsheet, a word processor, or the like, which can output in image forming apparatus 2, and can spool in storage part 19 as job 300.

(Step S102)

Then, authentication information generating part 110 performs a one-time password generating process. Authentication information generating part 110 generates one-time password 320, for example, with HOTP or TOTP algorithm, or the like. Authentication information generating part 110 can display the generated one-time password 320 on display part 32, can transmit it as an e-mail to e-mail address of the user, or can transmit it by SMS (Short Messaging Service), or the like.

(Step S201)

Then, job acquiring part 200 of image forming apparatus 2 performs an authentication inputting process. In pull print of the present embodiment, job 300 is selected with arbitrary image forming apparatuses 2 on network 5, this job 300 is acquired from terminal 1 of the user, and an output is possible.

Therefore, in the condition that job 300 is spooled, the user instructs executing of a dedicated application from operation panel part 26 of arbitrary image forming apparatuses 2. In that case, the input screen of PIN code 311 is displayed on display part 42, and the user inputs PIN code 311 from input part 41. Otherwise, when a login process to arbitrary image forming apparatus 2, or the like, is performed by operation panel part 26 of image forming apparatus 2, job acquiring part 200 may acquire PIN code 311 corresponding to the user to who is logged in from authentication table 310.

Job acquiring part 200, which has been acquired PIN code 311, transmits PIN code 311 to terminal 1 included in terminal information 312 corresponded with PIN code 311 with reference to authentication table 310. In the case of this transmission, PIN code 311 may be encrypted with a public key, a symmetric key, or the like.

(Step S103)

Here, authentication part 120 of terminal 1 performs authenticating process. Authentication part 120 acquires PIN code 311 from image forming apparatus 2 and compares with authentication table 310. Further, authentication part 120 requests that one-time password 320 is further transmitted to image forming apparatus 2, which has been acquired PIN code 311.

In that case, in the respective image forming apparatus 2, the input screen of one-time password 320 is displayed on display part 42, and the user inputs one-time password 320 from input part 41. Job acquiring part 200 also transmits this inputted one-time password 320 to terminal 1, which has been transmitted PIN code 311.

Authentication part 120 acquires one-time password 320 inputted by the user from image forming apparatus 2 and also compares it with authentication table 310.

(Step S104)

Then, authentication part 120 determines whether the authentication is in success or not. Authentication part 120 determines Yes if PIN code 311 and one-time password 320 inputted with image forming apparatus 2 can be compared, correctly. In the other cases, authentication part 120 determines No. In Yes, authentication part 120 advances a process to Step S105. In No, authentication part 120 ends the pull print process in terminal 1.

(Step S105)

In case of an authentication success, job transmitting part 130 performs a success showing process. Job transmitting part 130 transmits the list of jobs 300 spooled in terminal 1 to the authenticated image forming apparatus 2 as a personal job list.

(Step S202)

Here, job acquiring part 200 of image forming apparatus 2 performs a job selecting process. Job acquiring part 200 displays the personal job list acquired from terminal 1 on display part 42. FIG. 6 shows screen example 500 for this selection screen. In this example, three jobs 300, "My Print Job No.1.pdf", "My Print Job No.2.doc", and "My Print Job No.3.xls," are indicated as the job list. A check box for selection is displayed on the right side of each jobs 300. For example, the user can select job 300 to output by depressing the check box with input part 41.

(Step S203)

Here, authentication transmitting part 140 of image forming apparatus 2 determines whether selected job 300 can be printed in the self-apparatus or not. Authentication transmitting part 140 determines whether the output is possible with the self-apparatus or not for each job 300 of the job list by referencing its job information and equipment information 330 of image forming apparatus 2.

Here, with FIG. 6, the mark that shows whether the job 300 is printable or not by the self-apparatus is explained. Authentication transmitting part 140 shows the mark indicating whether the job 300 is printable or not with authenticated image forming apparatus 2 (the self-apparatus) next to the check box for selection on the right side of job 300. In this example, the mark of "Ready" that shows printable is indicated for "My Print Job No.1.pdf."

As compared with this, in "My Print Job No.2.doc" and "My Print Job No.3.xls," the triangular "!" mark that shows not-printable output, as it is, is indicated. For example, when the "!" mark is pressed, authentication transmitting part 140 displays the result of the decision whether or not to print is possible with the above-mentioned self-apparatus. In detail, for example, if "My Print Job No.2.doc" is a job 300 including a color page, and an output, as it is, is impossible, authentication transmitting part 140 displays "This job includes 10 pages of color pages and thus it will be printed in black and white," or the like. In the other case, about "My Print Job No.3.xls", if the number of pages is large and the recording paper is in short, and an output, as it is, is impossible, authentication transmitting part 140 displays "This job includes 800 pages of black-and-white pages. However, since there is a shortage of recording paper, additional supply during the process is required."

If job 300, which is printable with the self-apparatus, is selected, authentication transmitting part 140 determines Yes. For example, if a case of job 300 of duplex printing including a color page, authentication transmitting part 140 determines Yes in case that image forming apparatus 2 is color printable, has enough recording papers and toner for number of copies and pages of job 300, is duplex printable, and is being able to output in the output language of job 300. Authentication transmitting part 140 determines No if other cases, for example, job 300, which the output is impossible (not allowing) with the self-apparatus, is selected. In Yes, authentication transmitting part 140 advances a process to Step S204. In No, authentication transmitting part 140 advances a process to Step S206.

(Step S204)

Here, job acquiring part 200 of image forming apparatus 2 performs a job acquiring process. In the example of FIG.

6, when the user selects printable job 300 and depresses print button P in input part 41, job acquiring part 200 requires acquisition of selected job 300 to terminal 1. Then, job acquiring part 200 receives job 300 transmitted from terminal 1 and stores it in storage part 29.

(Step S106)

Here, job transmitting part 130 of terminal 1 performs a job transmitting process. Job transmitting part 130 acquires the information about job 300 selected with image forming apparatus 2, reads this job 300 from storage part 19, and transmits it to image forming apparatus 2.

(Step S205)

Here, job acquiring part 200 and image formation part 27 of image forming apparatus 2 perform an image formation process. Job acquiring part 200 performs image formation of the acquired job 300 by image formation part 27 and makes it record on a recording paper. Otherwise, job acquiring part 200 can also output by performing facsimile transmission of the data, which is performed image formation by image formation part 27, by FAX transmission and reception part 28, can further convert job 300 into a document data and can perform e-mail transmission, or can store in the document box of the user. Then, image forming apparatus 2 ends the pull print process of the present embodiment.

(Step S206)

If job 300 that is not printable with the self-apparatus is selected, equipment information transmitting part 210 performs an equipment information transmitting process. As explained with screen example 501 in FIG. 7, for example, when each job 300 cannot be output due to an out-of-order, or the like, in the first place, authentication transmitting part 140 displays "Printing is impossible. Do you print on another image forming apparatus?", or the like. In this case, each job 300 and print button P are to be in un-selectable state. Then, equipment information transmitting part 210 transmits equipment information 330 of the self-apparatus to terminal 1. Furthermore, equipment information transmitting part 210 instructs to other image forming apparatuses 2 on network 5 for transmitting equipment information 330 to terminal 1.

(Step S107)

Here, authentication transmitting part 140 of terminal 1 performs an authentication information transmitting process. Authentication transmitting part 140 determines which image forming apparatus 2 can output the selected job 300 by equipment information 330 received from image forming apparatuses 2, which are the self-apparatus and the other apparatus and perform presentation to the user. This presentation may be displayed on display part 42 of image forming apparatus 2 (self-apparatus,) which the user is operating, and may be indicated by the e-mail addressed to the user, or the like. Then, when the user selects outputting selected job 300 with image forming apparatus 2 (other apparatus) in which the output is possible according to the presentation, authentication transmitting part 140 outputs it with the respective other apparatus as the authenticated state. According to the present embodiment, for example, PIN code 311 and one-time password 320 are transmitted to the other apparatus, and image formation of the job 300 is performed with the other apparatus. As above-mentioned, the pull print process according to the embodiment of the present disclosures is ended.

The following effects can be obtained as configured as mentioned above. The technology of a typical pull print, a server that accumulates document data is indispensable. However, a typical scanning system that does not use a server cannot apply to pull print. Against this, image forming system X according to the embodiment of the present disclosures is an image forming system having a terminal 1 allowing to generate a job 300 of a pull print and an image forming apparatus 2 being connected with the terminal 1 including: the terminal 1 comprising: a job storage configured to store the job 300 of the pull print, an authentication information generating part 110 configured to generate authentication information for authenticating the pull print, an authentication part 120 configured to authenticate the authentication information generated by the authentication information generating part 110, and a job transmitting part 130 configured to transmit the job 300 stored in the job storage when being success in authentication by the authentication part 120; and the image forming apparatus 2 comprising: a job acquiring part 200 configured to acquire the job 300 from the terminal 1 when connecting with the terminal 1 and being success in authentication by the authentication information, and an image formation part 27 that performs image formation of the job 300 acquired by the job acquiring part 200. As configured in this way, serverless pull print is enabled. That is, in arbitrary image forming apparatuses 2 of network 5, job 300 spooled, or the like, in terminal 1 can be outputted by pull print. Also, without having a server, or the like, setup effort and management resources required for the dedicated application of the image forming apparatus 2 or a server can be reduced.

Also, if configuring that the job is spooled on an image forming apparatus, and the image forming apparatus performs pull print, the management and performance of the image forming apparatus may be affected. In addition, the storage capacity of HDD, SSD, or the like, in the image forming apparatus and is squeezed, and further, there are security concerns such as these being removed and read out. As compared with this, since, in image forming system X in the present embodiment, job 300 is spooled to terminal 1 and is only acquired in image forming apparatus 2 at the time of outputting, the storage capacity of storage part 29 in image forming apparatus 2 can be saved. Furthermore, pull printing with image forming apparatus 2 without HDD, SSD, or the like, also becomes possible. Further, the security risk for a confidential document stored in image forming apparatus 2 can be decreased. That is, since job 300, which is not outputted, does not remain in storage part 29 in image forming apparatus 2, security level can be improved.

Also, in image forming system X according to the embodiment of the present disclosures, authentication information includes PIN code 311 and one-time password 320. As configured in this way, as compared with pull print only in PIN code 311, security can be improved. Furthermore, in the time that a user intends for pull print, apart from the PIN code 311, one-time password 320 can be sent to the user, separately. Thereby, this can improve the user's usability for pull print.

Also, in image forming system X according to the embodiment of the present disclosures, terminal 1 is further provided with authentication transmitting part 140 configured to transmit authentication information to other image forming apparatus 2 and/or other terminals 1. As configured in this way, sharing authentication table 310 between image forming apparatuses 2 or between terminals 1, transmitting PIN code 311 and one-time password 320 to image forming apparatus 2 or terminal 1 when required becomes possible. Thereby, this enables serverless pull print by using arbitrary image forming apparatuses 2 and terminals 1. Therefore, the usability of the user can be improved.

Also, in image forming system X according to the embodiment of the present disclosures, the image forming apparatus 2 further comprising an equipment information transmitting part 210 configured to transmit equipment information 330 showing output ability of the image forming apparatus 2 itself to the terminal 1; and the authentication transmitting part 140 refers the equipment information 330 of the image forming apparatus 2, when the job is not allowing output with the image forming apparatus 2, transmitting the authentication information to the other image forming apparatus 2, permitting output in the respective other image forming apparatus 2 without authentication. As configured in this way, even if the self-apparatus does not have ability to output job 300, which the user selected, without re-authenticating with PIN code 311 or one-time password 320, or the like, in the other apparatus, the job 300 can be output. Thereby, usability for a user can be improved.

Other Embodiments

In addition, in the above-mentioned embodiment, pull printing of job 300 currently spooled in terminal 1 of the user is described. However, to configure the terminals 1 other than the same user to share job 300 is also possible. Otherwise, to once store job 300 in external NAS (Network Attached Storage), the server on a cloud, or the like, is also possible. In these cases, to encrypt job 300 by using authentication information is also possible. As configured in this way, even if there are little storage capacities in storage part 19 in terminal 1 of the user, pull print can be performed.

In the above-mentioned embodiment, an example is described that PIN code 311 is set up as like a user ID. However, a configuration that PIN code 311 is generated one by one, or a user sets up it each time of the generation of job 300 is also possible. That is, to generate PIN code 311 not on a user basis but on a job 300 basis is also possible. As configured in this way, security can further be improved.

In the above-mentioned embodiment, the example is explained that performs the printout of the job 300. However, the output of job 300 is possible also about network FAX transmission, or the like. Furthermore, also about a network scan, or the like, applying, similarly, is possible. In this case, a configuration for once spooling the document data scanned by image forming apparatus 2, authenticating, and acquiring it at terminal 1 is also possible. As configured in this way, a FAX transmission, a network scan, or the like, can be executed without a server.

Also, the configuration and operation of the above-mentioned embodiment are an example, and it cannot be over-emphasized that it can change suitably and can execute in the range which does not deviate from the aim of the present disclosure.

What is claimed is:

1. An image forming system having a terminal allowing to generate a job of a pull print and an image forming apparatus being connected with the terminal,
the terminal comprising:
a job storage configured to store the job of the pull print,
a first controller and first memory comprising a first control program stored thereon, wherein the first controller is configured to read the first control program to function as:
an authentication information generating part configured to generate authentication information for authenticating the pull print,
an authentication part configured to authenticate the authentication information generated by the authentication information generating part,
a job transmitting part configured to transmit the job stored in the job storage when being success in authentication by the authentication part; and
an authentication transmitting part configured to transmit the authentication information to an other image forming apparatus after the authentication part authenticates the authentication information; and
the image forming apparatus comprising:
a second controller and second memory comprising a second control program stored thereon, wherein the second controller is configured to read the second control program to function as:
a job acquiring part configured to acquire the job from the terminal when connecting with the terminal and being success in authentication by the authentication information,
an image formation part which performs image formation of the job acquired by the job acquiring part; and
an equipment information transmitting part configured to transmit equipment information showing output ability of the image forming apparatus itself to the terminal; wherein
the authentication transmitting part is configured to
refer to the equipment information of the image forming apparatus, and then
when the equipment information indicates the job is not allowed to be outputted with the image forming apparatus, performs said transmission of the authentication information to the other image forming apparatus, and permits to output the job in the other image forming apparatus without authentication;
and wherein
the authentication information includes a PIN code and a one-time password; and wherein
the PIN code is inputted by a user and is shared between an other terminal and the other image forming apparatus with an authentication table that includes the PIN code and terminal information for specifying the terminal by the PIN code,
the one-time password is not shared with the authentication table, and
the job acquiring part sends the authentication information to the terminal that is specified by the authentication table.

2. The image forming system according to claim 1, wherein the terminal is configured to
receive equipment information of the other image forming apparatus,
determine, based on the equipment information received from the other image forming apparatus, that the other image forming apparatus can output the job,
present the result of the determination to a user on a display,
allow the user to select the other image forming apparatus, and
when the user selects the other image forming apparatus, perform said transmission of the authentication information to the other image forming apparatus, and said permitting to output the job in the other image forming apparatus without authentication.

3. The image forming system according to claim 1, wherein
the authentication of the authentication information comprises the terminal receiving the authentication information sent from the job acquiring part of the image forming apparatus and comparing the authentication information received from job acquiring part the image forming apparatus with the authentication information generated by the authentication information generating part; and the authentication transmitting part send the authentication information sent from the image forming apparatus to the other image forming apparatus that is permitted to output the job.

4. The image forming system according to claim 1, wherein the authentication information generating part checks that the PIN code is not specified to the other terminal.

5. The image forming system according to claim 1, wherein the authentication information generating part sets up storage capacity of an area of a storage part in the terminal that spools the job, period to spool, and other printing restrictions.

6. The image forming system according to claim 1, wherein the authentication information generating part sets up period or a time zone where pull print by using the terminal is enabled.

7. The image forming system according to claim 1, wherein the job transmitting part, when little storage capacities in the job storage, shares the job to a terminal of another user that is not the user, an external network attached storage, or a server on a cloud, wherein the job is shared by encrypting the job by using the authentication information.

8. An image forming method executed by an image forming system having a terminal allowing to generate a job of a pull print and an image forming apparatus being connected with the terminal, comprising the steps of:

by the terminal, storing the job of the pull print;

by the terminal, generating authentication information for authenticating the pull print;

by the image forming apparatus, connecting with the terminal;

by the terminal, authenticating about the generated authentication information;

by the terminal, transmitting the stored job when being success in authentication;

by the image forming apparatus, acquiring the job from the terminal; and by the image forming apparatus, when image formation of the acquired job is possible in the image forming apparatus, performing image formation of the acquired job;

by the image forming apparatus, after the terminal authenticates the authentication information, and when image formation of the acquired job is not possible in the image forming apparatus, transmitting equipment information showing output ability of the image forming apparatus itself to the terminal;

by the terminal, referring to the equipment information of the image forming apparatus;

by the terminal, when the equipment information indicates the job is not allowed to be outputted with the image forming apparatus, transmitting the authentication information to an other image forming apparatus; and by the terminal, permitting to output the job in the other image forming apparatus without authentication;

wherein the authentication information includes a PIN code and a one-time password;

the PIN code is inputted by a user and is shared between an other terminal and the other image forming apparatus with an authentication table that includes the PIN code and terminal information for specifying the terminal by the PIN code, the one-time password is not shared with the authentication table, and the image forming apparatus sends the authentication information to the terminal that is specified by the authentication table.

9. The image forming method according to claim 8, wherein the method comprises:

by the terminal, receiving equipment information of the other image forming apparatus, by the terminal, determining, based on the equipment information received from the other image forming apparatus, that the other image forming apparatus can output the job, by the terminal, presenting the result of the determination to a user on a display, by the terminal, allowing the user to select the other image forming apparatus, and by the terminal, when the user selects the other image forming apparatus, perform said transmission of the authentication information to the other image forming apparatus, and said permitting to output the job in the other image forming apparatus without authentication.

10. The image forming method according to claim 8, further comprising sending, by the image forming apparatus, authentication information to the terminal, wherein the step of authenticating about the generated authentication information comprises receiving, by the terminal, the authentication information sent from the image forming apparatus; and comparing the authentication information received from the image forming apparatus with the generated authentication information.

* * * * *